United States Patent
Girard et al.

(10) Patent No.: US 6,854,963 B2
(45) Date of Patent: Feb. 15, 2005

(54) RADIALLY EXPANDABLE BEAD MOLDING RING FOR A TIRE MOLD

(75) Inventors: Jean-Claude Girard, Copley, OH (US); Brett Alan Kasper, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 219 days.

(21) Appl. No.: 10/058,538

(22) Filed: Jan. 28, 2002

(65) Prior Publication Data

US 2003/0141627 A1 Jul. 31, 2003

(51) Int. Cl.$^7$ .............................................. B29C 35/02
(52) U.S. Cl. ....................................................... 425/36
(58) Field of Search ........................... 425/36; 264/315, 264/326, 501

(56) References Cited

U.S. PATENT DOCUMENTS

| | | | | |
|---|---|---|---|---|
| 1,989,363 A | * | 1/1935 | Iverson | 425/36 |
| 2,904,832 A | * | 9/1959 | Frohlich et al. | 425/36 |
| 4,154,790 A | * | 5/1979 | Allitt | 425/36 |
| 4,236,883 A | | 12/1980 | Turk et al. | |
| 4,582,470 A | * | 4/1986 | Sarumaru | 425/36 |
| 5,127,811 A | * | 7/1992 | Trethowan | 425/36 |
| 5,129,802 A | | 7/1992 | Sergel et al. | |
| 5,164,199 A | * | 11/1992 | Fujieda et al. | 425/36 |
| 5,749,980 A | | 5/1998 | Izuchi et al. | |
| 5,776,508 A | * | 7/1998 | Irie | 425/36 |
| 5,787,950 A | | 8/1998 | Muhlhoff et al. | |
| 6,092,575 A | | 7/2000 | Drieux et al. | |
| 6,238,193 B1 | | 5/2001 | Bosseaux | |

OTHER PUBLICATIONS

Co–pending U.S. patent application Ser. No. 10/058,892 filed on even date herewith entitled Expandable Bead Molding Ring for a Tire Mold Inventors: Girard et al.

* cited by examiner

Primary Examiner—James P. Mackey
(74) Attorney, Agent, or Firm—Howard M. Cohn

(57) ABSTRACT

Apparatus and method for molding a tire (110) with a radially expandable bead molding ring (252). When expanded, the bead molding ring has a circumferentially continuous radially outward-facing surface (259) for molding the bead. The bead molding ring comprises a plurality of segments (254, 256), half of the segments being first segments (254) that are complementary to, and circumferentially alternated with second segments (256). The first segments are wedge shaped, having circumferentially lateral faces (255) that converge towards the radially outward-facing bead molding surface of the bead molding ring, the first segment lateral faces being planar and oriented in the axial direction; and the second segments have lateral faces (257) that are complementary to the first segment lateral faces, such that radially outward movement of the first segments (254) causes radially outward movement of the second segments (256). Guide rods (260) restrict first and second segments to radial movement (310) only. The elements of the bead molding ring are preferably combined in a single assembly (280) with the sidewall mold to form a unit that is easily maintained and changed to adapt to different profiles to be molded on beads of different tire constructions. Expansion of the bead molding ring can be driven by a simple wedging action caused by a single frustraconical cam 266.

9 Claims, 10 Drawing Sheets

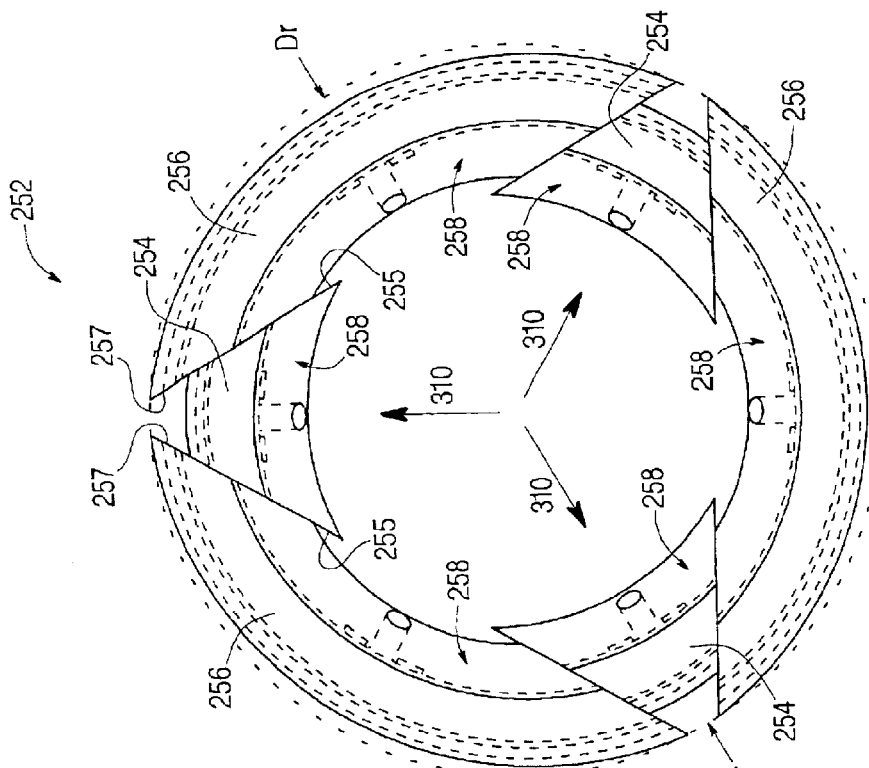
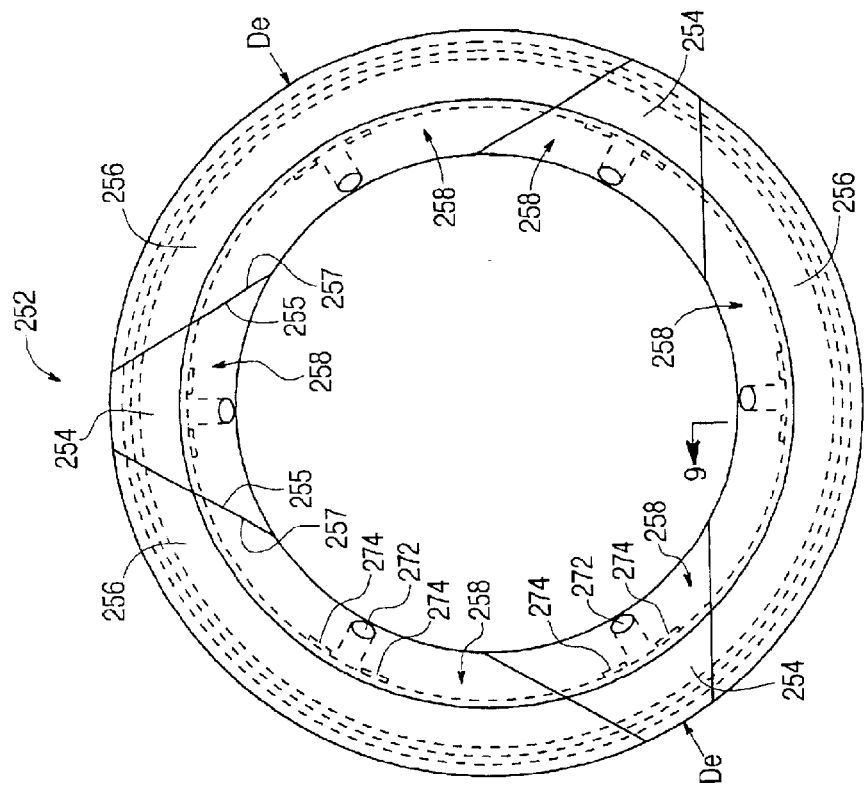

RADIALLY EXPANDABLE BEAD MOLDING RING FOR A TIRE MOLD

CROSS-REFERENCE TO RELATED APPLICATIONS

This application relates to a U.S. application Ser. No. 10/058,892 entitled EXPANDABLE BEAD MOLDING RING FOR A TIRE MOLD, having a filing date concurrent with that of the present invention.

TECHNICAL FIELD OF THE INVENTION

The present invention relates to the molding of tires. In particular, it pertains to methods and apparatus for molding a tire bead using a radially expandable bead molding ring.

BACKGROUND OF THE INVENTION

Reference is made herein to an "undercut" bead, referring to the shape of the bead base (the radially inner surface of a tire bead that seats in the bead seat portion of a wheel rim). Tire bead bases are most commonly substantially flat and are angled from zero to several degrees relative to the axial direction with the bead base angle opening axially outward. An undercut bead base may be similarly shaped except that the bead base angle opens axially inward. Examples of tires with undercut bead bases, and examples of wheel rims using such tires, are seen in U.S. Pat. No. 6,092,575. In particular, it should be noted that a common variant of a tire with the undercut bead base design comprises beads of two different diameters on the same tire.

In order to mold certain tire constructions, such as those having undercut beads, it becomes necessary to introduce a portion of the tire mold known as the bead molding ring or counter-molding ring into the interior of the tire in order to engage a molding surface against the bead base. In the prior art, means are known for accomplishing the molding of an undercut portion of a tire bead. For example, U.S. Pat. No. 5,129,802 proposes using two counter-molding rings (bead molding rings) for the axially and radially inner portion of the bead, said rings being continuous. In order to introduce the counter-molding rings into the interior of the tire, it is necessary to deform the raw blank of the tire by ovalizing at least one of the beads, so that the bead can be made to pass beyond the counter-molding ring or rings.

Rings for molding the radially and axially inner portion of a bead have also been described in connection with so-called membrane-less vulcanizing presses. See, for example, U.S. Pat. No. 4,236,883 (referred to hereinafter as the '883 patent), which discloses such rings, in this instance made in several segments circumferentially adjacent in molding position. These rings are radially retractable so that they can be introduced into the tire interior without requiring deformation of the tire beads. The '883 patent describes a mechanism occupying integrally the inner volume of the press, so that the necessary movements can be imparted to the several ring segments in order for said segments to accommodate a closing or opening movement in sequence. By a "movement in sequence" is meant that, from a configuration in which the mold is open, the segments do not all go to their molding position at the same time. A first group is brought to its final molding position, then the segments of a second group are inserted between segments of the first group to make a continuous ring. As seen in the '883 patent's FIGS. 1–2, the first and second segments join along axially aligned planar surfaces, and all segments rotate into position by means of bellcranks (66) rotating on pivots (70) in depending clevis' (74). The bellcranks have cam followers that coact with a multi-faceted linear cam assembly (102) for controlled actuation of the segments mounted on the bellcranks.

U.S. Pat. No. 6,238,193 (referred to hereinafter as the '193 patent) discloses a mold for a tire and a vulcanizing press fitted to receive said mold: a mold for molding a tire having beads of different diameters, $\Phi 0$ being the minimum diameter of the tire area at the bead of smaller diameter, $\Phi 2$ being the minimum diameter of the tire area at the bead of greater diameter. The mold has two sidewall plates for molding, respectively, the outer surface of the sidewalls and the outer portion of each bead up to a radially inner limit where the diameter of the tire area is $\Phi 0$ and $\Phi 2$, respectively, a continuous counter-molding ring to mold the bead of smaller diameter from the said radially inner limit where the diameter of the tire area is $\Phi 0$ to an axially inner limit of diameter $\Phi 1$, where $\Phi 1$ is smaller than $\Phi 2$, and a split counter-molding ring to mold the bead of greater diameter from the said radially inner limit where the diameter of the tire area is $\Phi 2$ to an axially inner limit of diameter $\Phi 3$. As seen in the '193 patent's FIG. 1, the tire bead bases are undercut, i.e., $\Phi 1$ is greater than $\Phi 0$, and $\Phi 3$ is greater than $\Phi 2$. The split ring includes a plurality of retractable segments adjacent in molding position. A flexible membrane molds the inner surface of the tire in the portion of the inner cavity of the tire between the limit of diameter $\Phi 1$ and the limit of diameter $\Phi 3$.

As viewed in its FIGS. 2–11, the '193 patent discloses a complex mechanism for engaging the split counter-molding ring to mold the lower bead (the bead with the greater diameter). The split counter-molding ring is annular and comprises large segments (141) with beveled edges and smaller key segments (142) having corresponding beveled edges. The edges are beveled at an angle to the axial direction (see FIG. 4), so that the key segments can be fitted into the annular ring by moving axially down in between the large segments. After the segments have been fitted together (FIGS. 8–10), the ring is pressed down axially against the lower mold sidewall plate 12 to form the bead area (FIG. 11). A problem with the split counter-molding ring design is a complex set of linkages and mechanisms attached to the mold press that is difficult and expensive to manufacture, and that also makes maintaining and changing the vulcanizing mold in the press a time-consuming and difficult process. As viewed in the '193 patent's FIG. 2, the split counter-molding ring (14) comprises first segments (141) each mounted on a rocking arm (52), itself mounted rotatably on the slide (17) that is mounted on the lower frame 22 of the press. A roller (521) mounted on each of the rocking arms acts against a first cam 42 that is integral with the lower membrane plate (32). The second (key) segments (142) are mounted on a guide plate (321) in grooves (53) formed between said guide plate (321) and the first cam (42). A roller (531) is rotatably mounted on each of the second segments and rides against a second cam (43) fixed on the lower frame (22) of the press. The profile of the radially outer surface of said second cam (43) serves to impart a controlled motion for the advance of each of the second segments (142).

It is an object of the present invention to overcome the problems and limitations of the prior art tire molds, particularly molds using radially expandable bead molding rings, such as for molding undercut beads. Problems to be solved include reduction of mechanical complexity to simplify manufacturing of the molds, and to ease mold/press maintenance and changeover.

BRIEF SUMMARY OF THE INVENTION

According to the invention, a bead molding ring is disclosed for a tire mold in a mold press that is configured to mold a green tire comprising a tread, two beads, and two sidewalls extending between the beads and the tread. The bead molding ring characterized in that the bead molding ring comprises a plurality of segments, half of the segments being first segments that are complementary to, and circumferentially alternated with second segments. The first segments are wedge shaped, having circumferentially lateral faces that converge towards a radially outward-facing bead molding surface of the bead molding ring. The first segment lateral faces are planar and oriented in an axial direction. The second segments have lateral faces that are complementary to the first segment lateral faces. Structural means are provided for radially expanding the bead molding ring from a first outside diameter ($D_r$) to a second outside diameter ($D_e$), thereby forming a circumferentially continuous radially outward-facing surface for molding one of the beads.

Further according to the invention, the first outside diameter ($D_r$) is less than or equal to the inside diameter (D4') of an unmolded bead that is to be molded by the bead molding ring.

According to the invention, the bead molding ring is further characterized by radially aligned guiding means movably connecting the mold with each of the first and second segments to restrict first and second segments to radial movement only. The molding ring also has spring means pressing radially inward on the first and second segments.

According to the invention, the bead molding ring is further characterized by a cam surface on the radially inner portion of the first and second segments of the bead molding ring. The cam surface slopes radially inward and axially outward at a cam angle to form an annular surface complementary to a frustraconical section. A cam is attached to an axially-moving part of the mold press such that the cam interacts with the cam surfaces of at least the first segments to wedge the first segments radially outward as the cam moves in an axial direction. Preferably the cam is a ring with a frustraconical radially outer cam surface that has a cam angle that matches the cam angle of the cam surfaces of the bead molding ring.

According to the invention, a mold is disclosed for a green tire comprising a tread, two beads each having a radially inward-facing bead base extending from an axially outer heel to an axially inner toe, and two sidewalls extending between the beads and the tread. The mold comprises first and second sidewall plates for molding, respectively, an outer surface of each of the sidewalls plus an axially outer portion of each of the beads approximately in to the heel. The mold also has first and second bead molding rings for molding at least the bead bases of the two beads and an inflatable vulcanizing membrane for molding the inside surfaces of the tire. At least a first bead molding ring comprises a plurality of segments, half of the segments being first segments that are complementary to, and circumferentially alternated with second segments. The first segments are wedge shaped, having circumferentially lateral faces that converge towards a radially outward-facing bead molding surface of the first bead molding ring. The first segment lateral faces are planar and oriented in the axial direction and the second segments have lateral faces that are complementary to the first segment lateral faces. Structural means radially expand the first bead molding ring from a first outside diameter ($D_r$) to a second outside diameter ($D_e$) thereby forming a circumferentially continuous radially outward-facing surface for molding one of the beads in cooperation with an adjacent first sidewall plate and the vulcanizing membrane.

According to the invention, the mold is further characterized by guide rods to restrict first and second segments to radial movement only. Each guide rod is mounted in a radially aligned mounting hole bored in a one of the first and second segments, and each mounting hole is aligned with a guide hole bored in the adjacent first sidewall plate such that the guide rod slides within the radially-aligned guide hole. Springs are preloaded to force radially-inward movement of the first and second segments. Each spring resides in a radially aligned spring holding hole bored in the adjacent first sidewall plate and is aligned with a spring pocket cut in an adjacent one of the first and second segments, so that a spring can be positioned with one end in the spring holding hole and the other end in an adjacent spring pocket. Preferably the mold is further characterized by an assembly comprising the first sidewall plate, all of the plurality of first segments and second segments, all of the guide rods, and all of the springs. The assembly is held together by stop bolts extending from a side of at least one of the guide rods, each stop bolt protruding into a cavity adjoining a portion of the corresponding guide hole.

According to the invention, the mold is further characterized by a cam surface on the radially inner portion of the first and second segments of the bead molding ring. The cam surface slopes radially inward and axially outward at a cam angle to form an annular surface complementary to a frustraconical section. A cam is attached to an axially-moving part of the mold press such that the cam interacts with the cam surfaces of at least the first segments to wedge the first segments radially outward as the cam moves in an axial direction. Preferably the cam is a ring with a frustraconical radially outer cam surface that has a cam angle that matches the cam angle of the cam surfaces of the bead molding ring. Furthermore, the cam can be attached to a clamp ring for clamping one end of the vulcanizing membrane.

According to the invention, the mold is further characterized in that the second bead molding ring is functionally the same as the first bead molding ring.

According to the invention, alternatively the second bead molding ring is a non-segmented, non-expandable, continuous ring. The tire may have asymmetric bead diameters such that a first bead has a first diameter (D4) and a second bead has a second diameter (D2) such that the second diameter is less than or equal to the first diameter in a way that allows the first bead to pass over the continuous second bead molding ring before passing over the first bead molding ring while the first bead molding ring is retracted to its first outside diameter ($D_r$).

According to the invention, the mold is further characterized in that the two beads have an undercut bead base.

According to the invention, a method is disclosed for molding a green tire comprising a tread, two beads, and two sidewalls extending between the beads and the tread. The method comprises the steps of: loading the tire into a mold comprising at least one retractable bead molding ring; passing an unmolded bead of the tire over the retractable bead molding ring while the ring is retracted to an outside diameter ($D_r$) that is less than or equal to the inside diameter (D4') of the unmolded bead; and expanding the retractable bead molding ring to engage the unmolded bead by moving only in a radially outward direction.

According to the invention, the method further comprises the step of, after engaging a first one of the beads with the retractable bead molding ring, expanding a vulcanizing membrane inside the tire to draw a second one of the beads into engagement with a bead molding ring.

According to the invention, the method further comprises the step of using an axial movement of a portion of the press to drive the radially outward movement of the retractable bead molding ring.

According to the invention, the method further comprises the step of composing the retractable bead molding ring of circumferentially alternated first segments and second segments such that radial expansion of the first segments causes radial expansion of the second segments.

According to the invention, the method further comprises the step of: assembling the retractable bead molding ring together with a sidewall molding plate.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1:
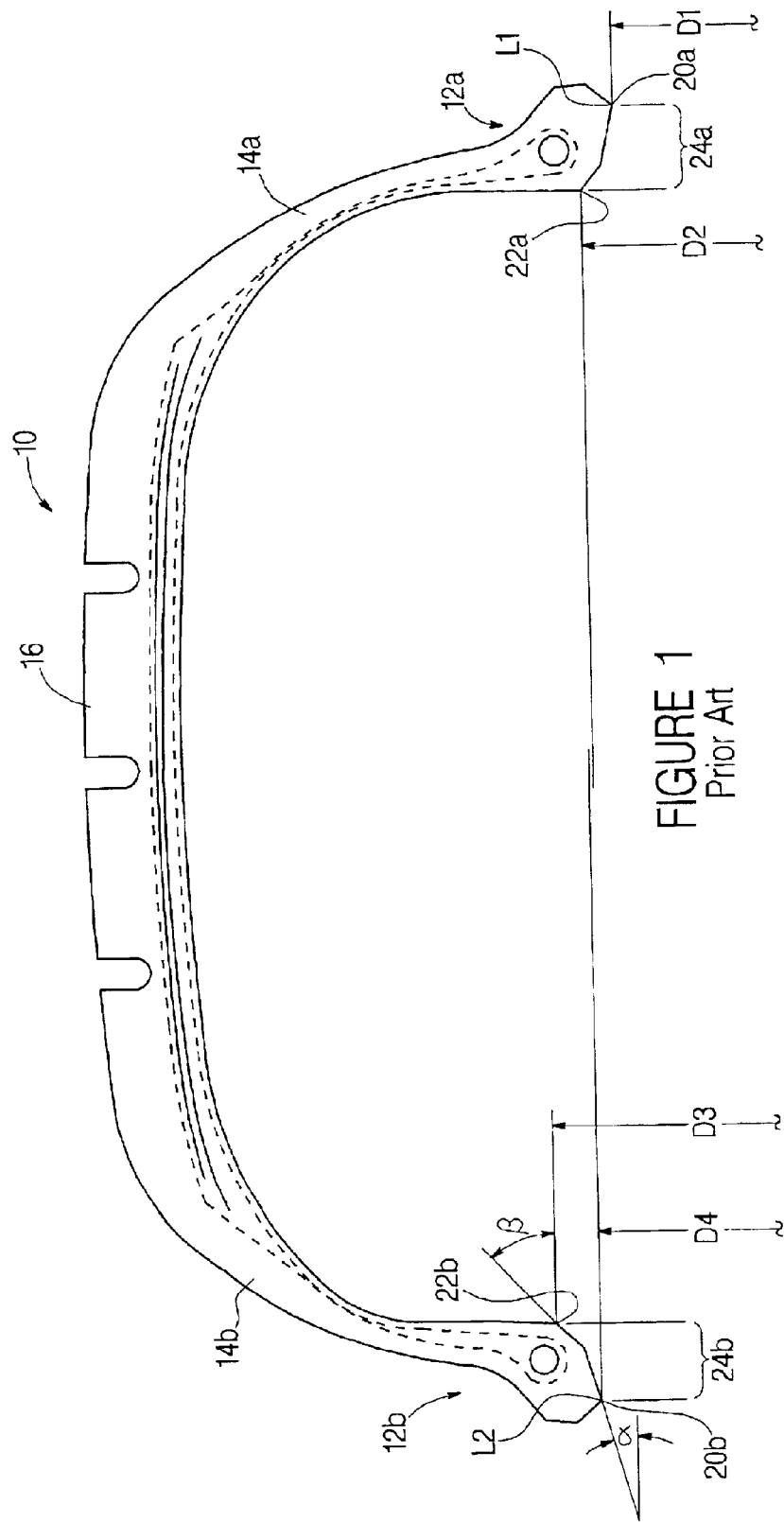
Figure 2:
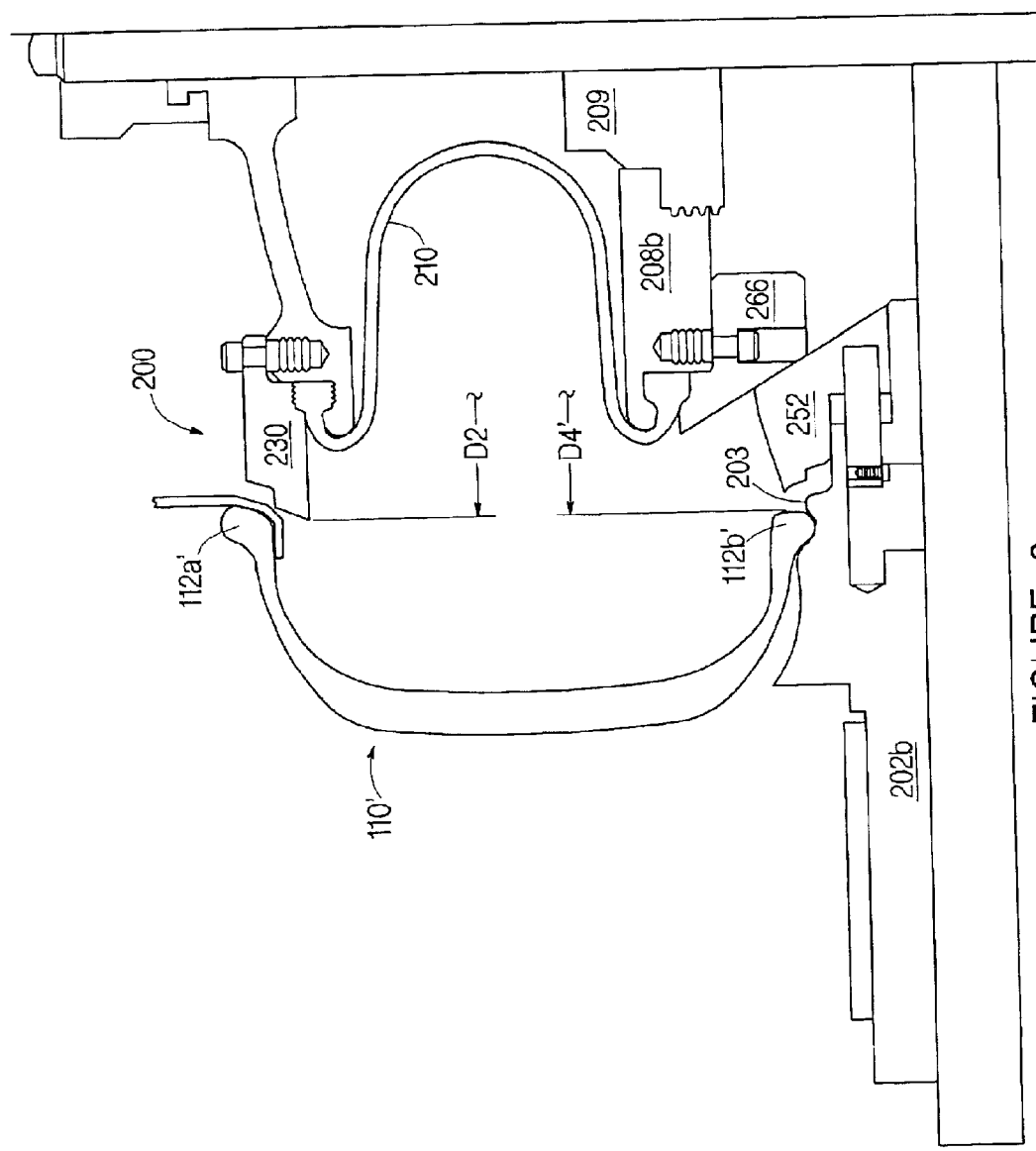
Figure 3:
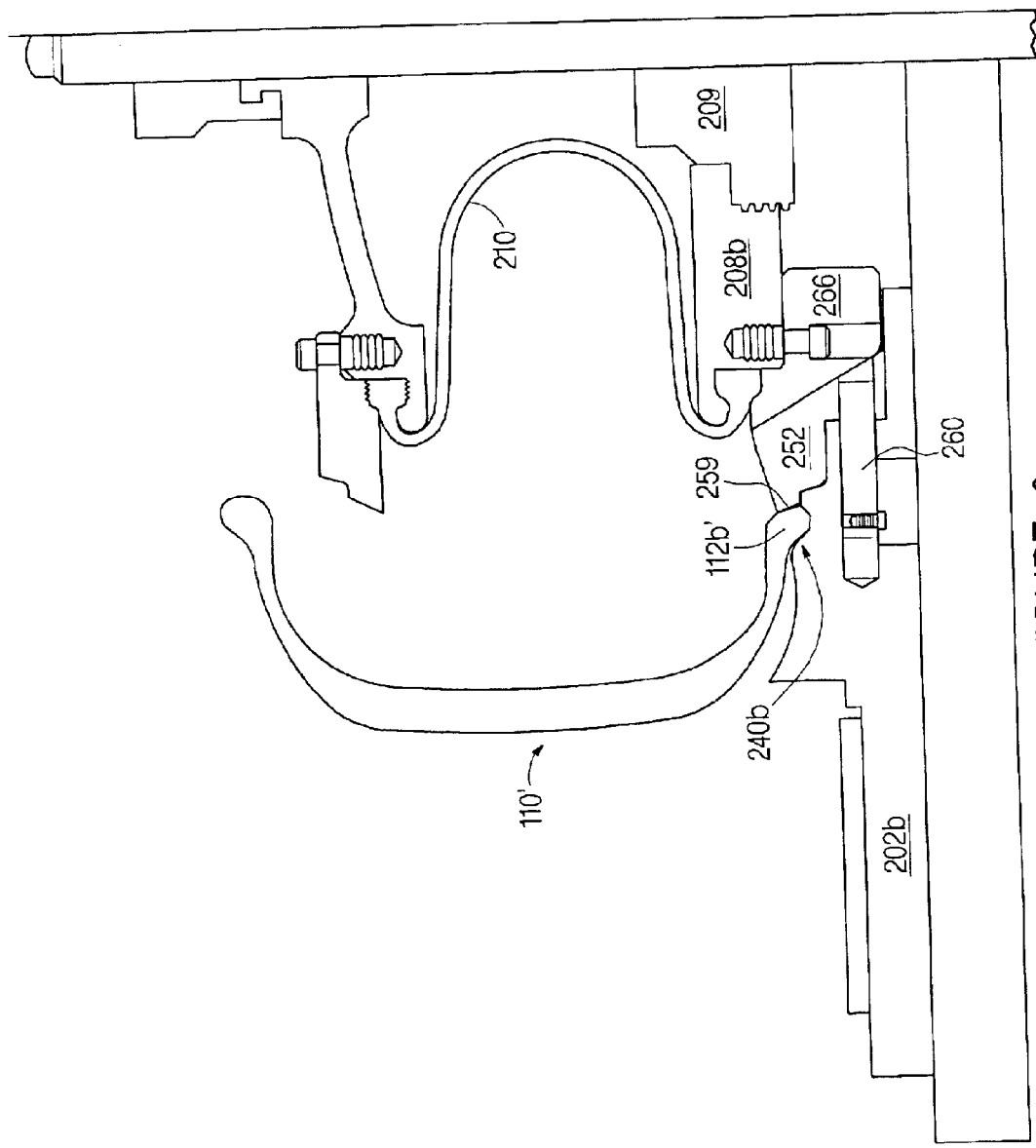
Figure 4:
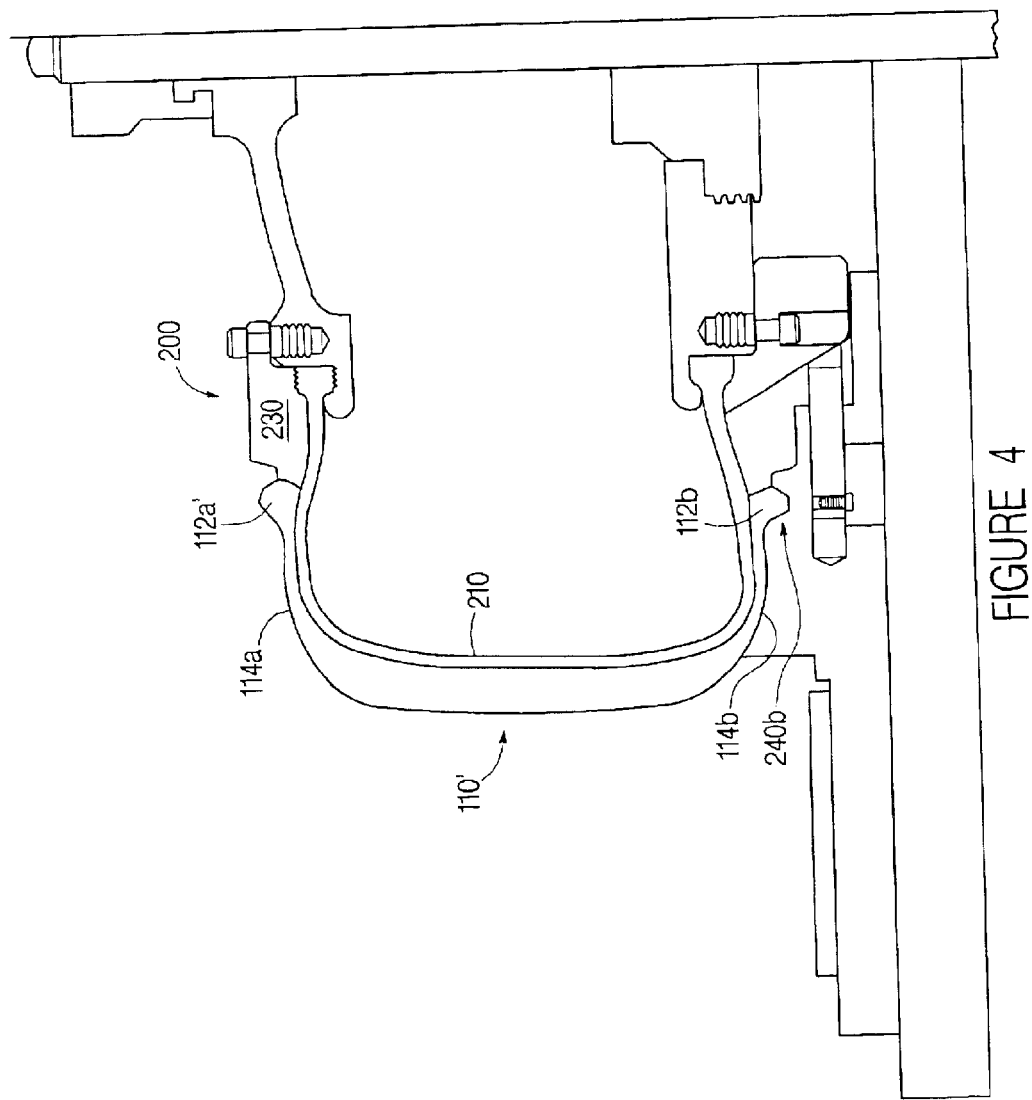
Figure 5:
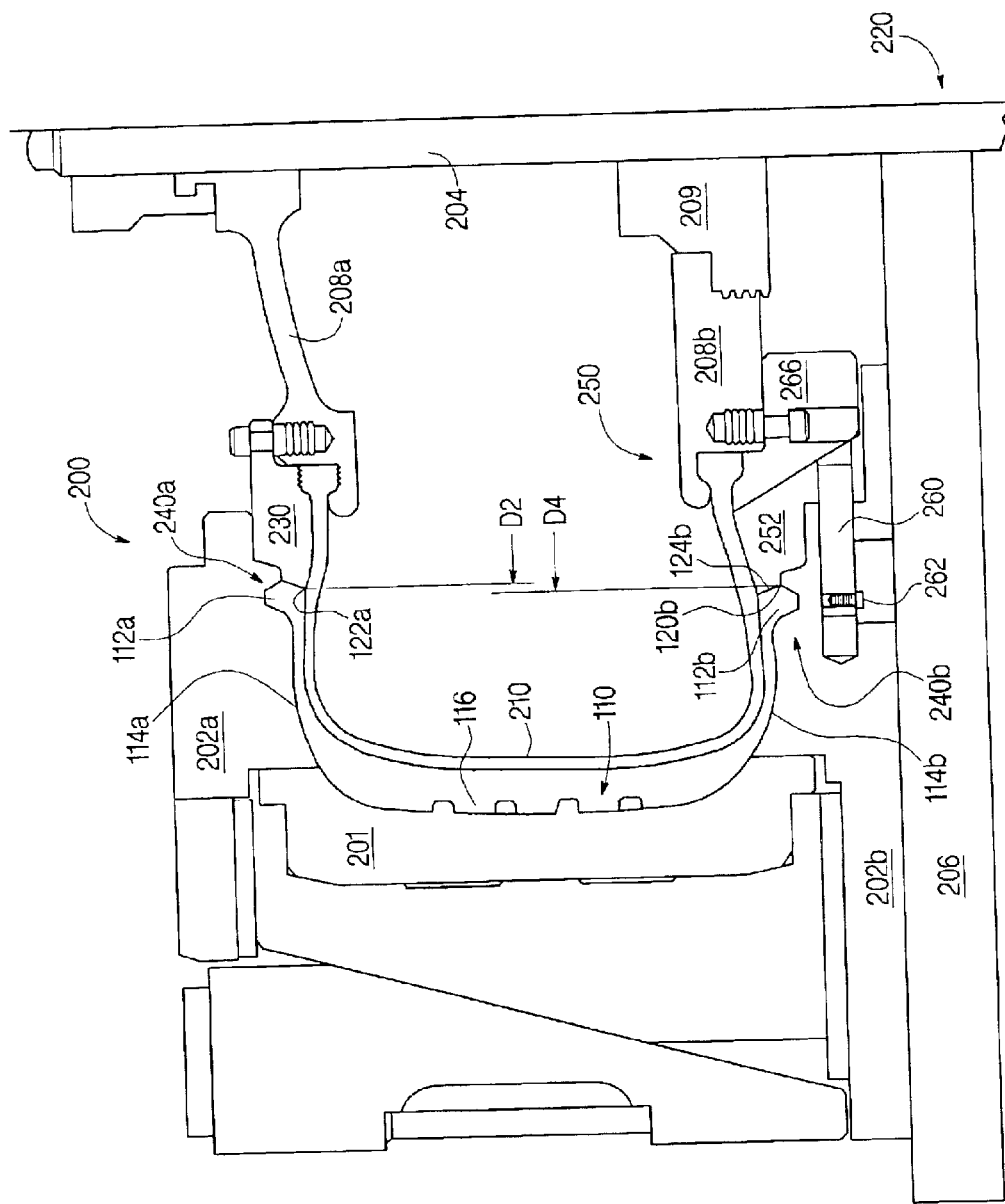
Figure 7A:
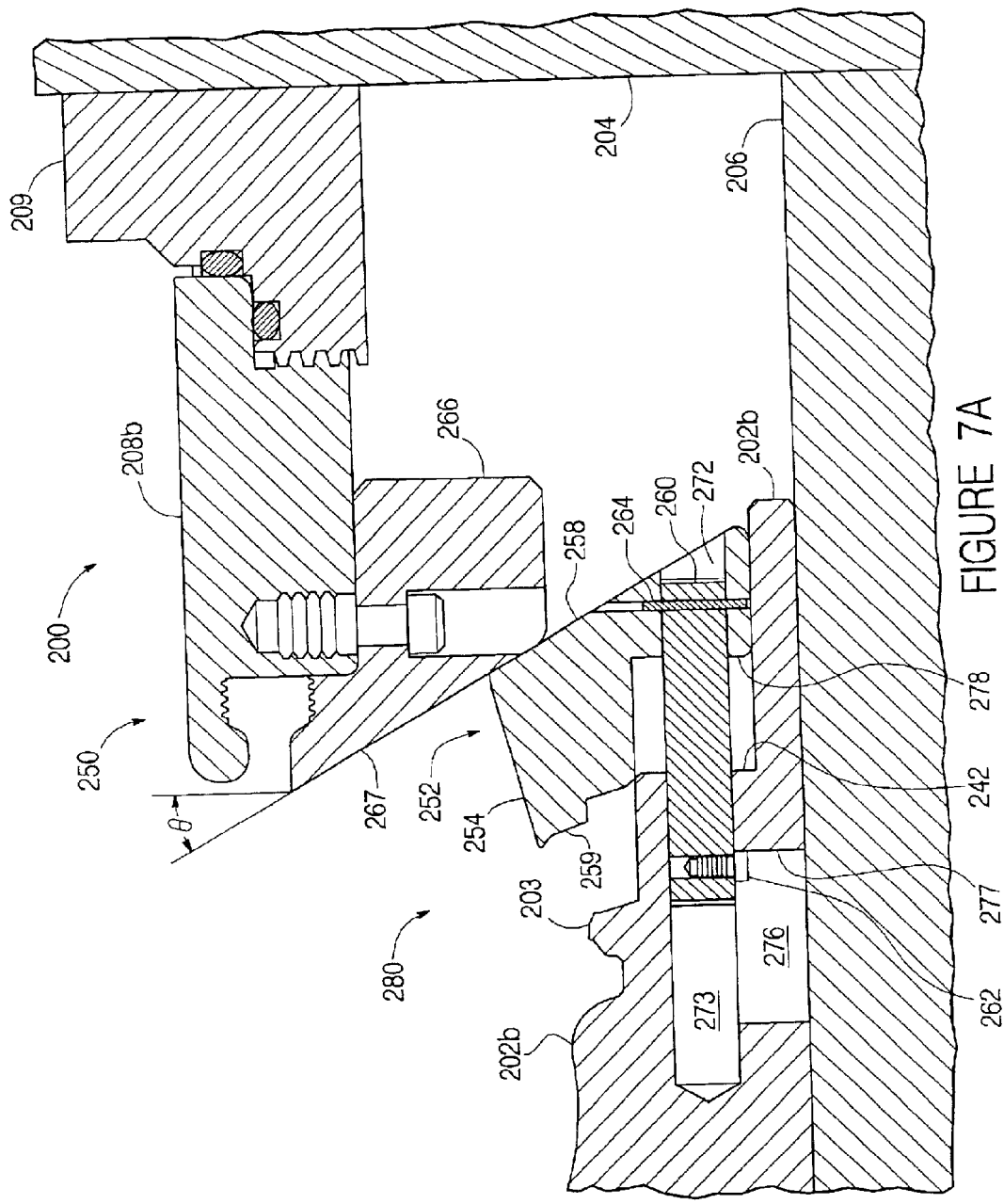
Figure 7B:
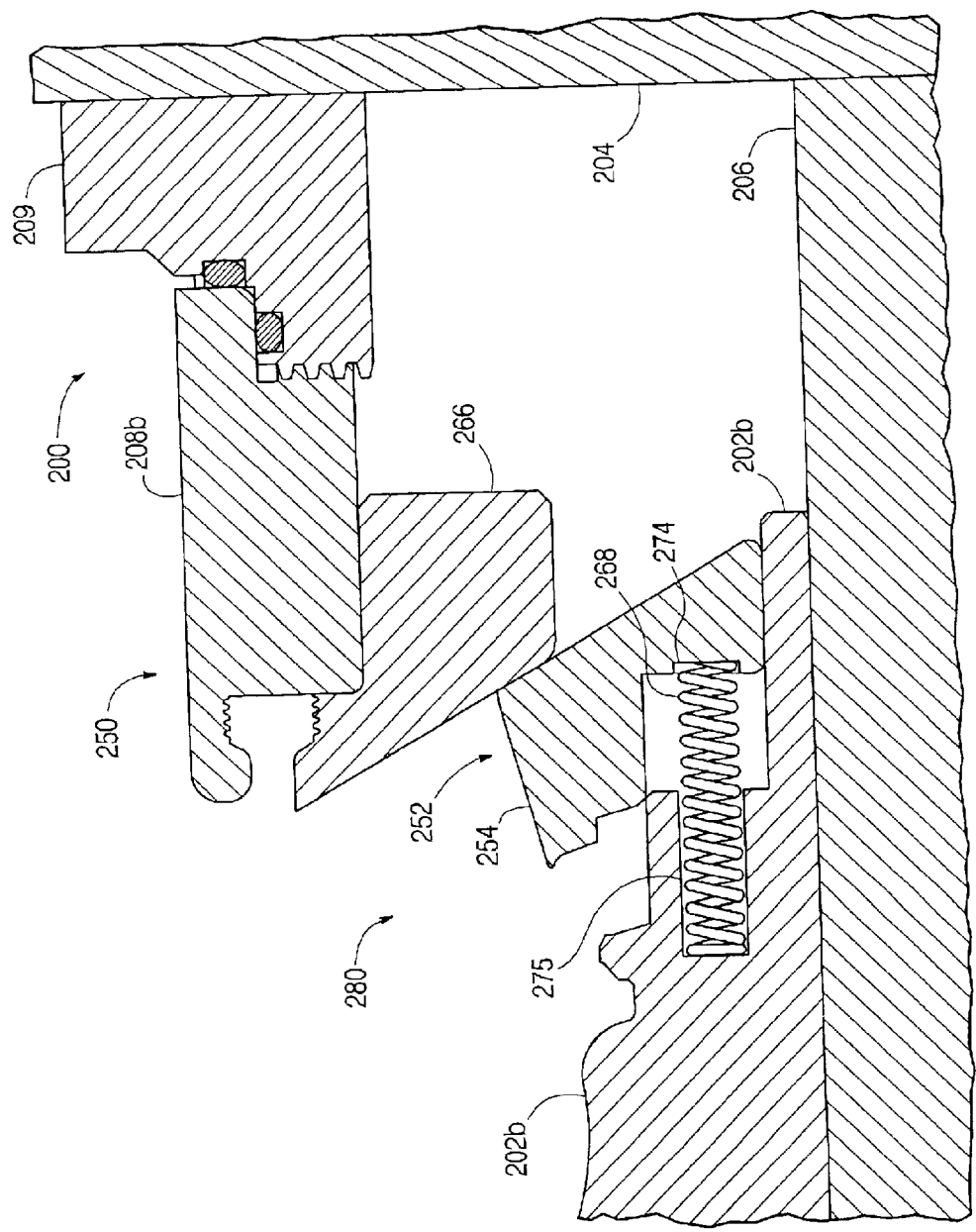
Figure 8:
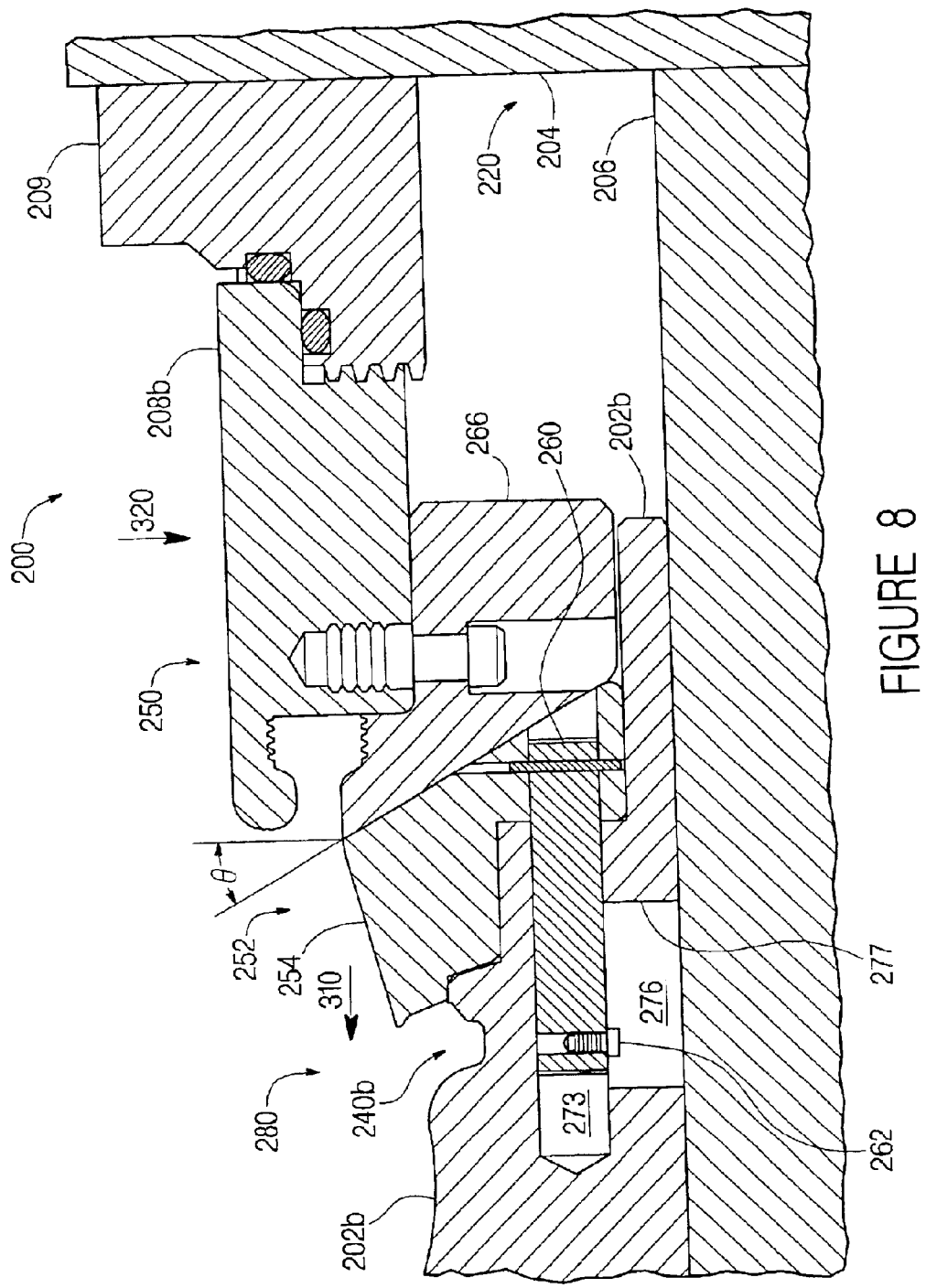
Figure 9:
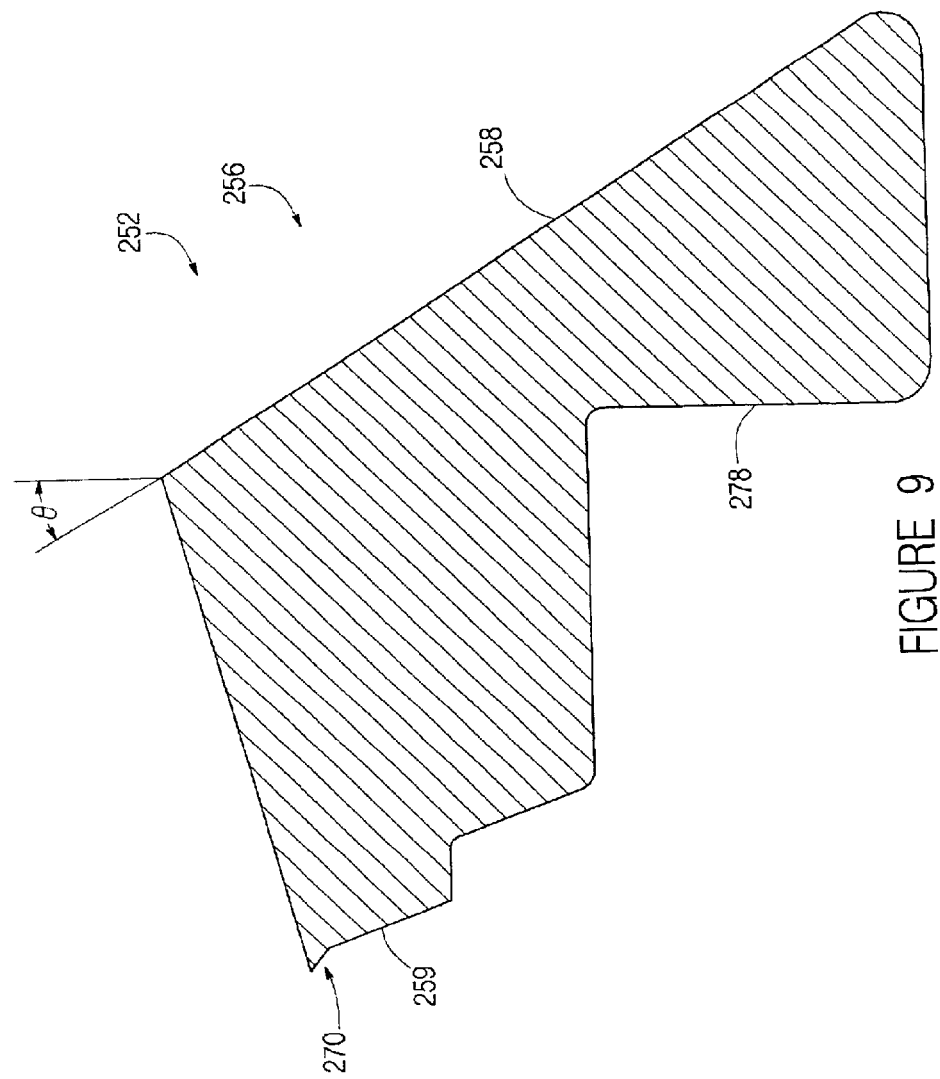

The structure, operation, and advantages of the present preferred embodiment of the invention will become further apparent upon consideration of the following description taken in conjunction with the accompanying drawings, wherein:

FIG. 1 is a meridional cross-sectional view, shading omitted for clarity of detail, of a prior art tire having undercut bead bases and asymmetric bead diameters;

FIG. 2 is a cross-sectional view, shading omitted for clarity of detail, of a portion of a mold with the unmolded tire being loaded, according to the invention;

FIG. 3 is a cross-sectional view, shading omitted for clarity of detail, of a portion of a mold with the bottom unmolded bead held by a radially expandable bead molding ring, according to the invention;

FIG. 4 is a cross-sectional view, shading omitted for clarity of detail, of a portion of a mold with a vulcanizing membrane inflated to pull the sidewalls and beads into molding position, according to the invention;

FIG. 5 is a cross-sectional view, shading omitted for clarity of detail, of a portion of a mold with the mold being closed around the tire for molding, according to the invention;

FIG. 6A is a top view of a segmented bead molding ring in an expanded state, according to the invention;

FIG. 6B is a top view of the segmented bead molding ring in a retracted state, according to the invention;

FIG. 7A is a detailed cross-sectional view of a portion of the mold of FIG. 2 (tire and vulcanizing membrane omitted), showing key elements of the radially expandable bead molding ring assembly when it is retracted in the mold, according to the invention;

FIG. 7B is a detailed cross-sectional view of a portion of the mold of FIG. 2 (tire and vulcanizing membrane omitted), similar to FIG. 7A but with the cross-section taken on a different radius line to show spring elements of the radially expandable bead molding ring assembly, according to the invention;

FIG. 8 is a detailed cross-sectional view of a portion of the mold of FIGS. 3–5 (tire and vulcanizing membrane omitted), showing key elements of the radially expandable bead molding ring assembly when it is expanded in the mold, according to the invention; and FIG. 9 is a cross-sectional view taken along the 9—9 line of FIG. 6A, showing a cross-sectional profile common to all of the segments of the segmented bead molding ring, according to the invention.

DETAILED DESCRIPTION OF THE INVENTION

In FIG. 1 a tire 10 of the prior art (see U.S. Pat. No. 6,092,575) is shown in meridional cross-section. The tire 10 comprises a tread 16, first and second beads 12a and 12b, respectively, and two sidewalls 14a and 14b extending between the tread 16 and the beads 12a and 12b, respectively. The beads 12a, 12b are undercut and the tire is asymmetric, having different bead diameters. Each bead 12a, 12b has a heel 20a, 20b, respectively, a toe 22a, 22b, respectively, and a bead base 24a, 24b, respectively, extending between the heel 20a, 20b and toe 22a, 22b. Typically a tire's bead base is planar from heel to toe, but it can have multiple surfaces as illustrated in FIG. 1. The undercut nature of the beads 12a, 12b is characterized by one or more acute bead base angles $\alpha$, $\beta$ that open axially inward. As a consequence, the bead diameter at the heel (the axially outermost extent of the bead base) is less than the bead diameter at the toe (the axially innermost extent of the bead base), i.e., bead heel diameter D1 is less than bead toe diameter D2 for the first bead 12a, and bead heel diameter D4 is less than bead toe diameter D3 for the second bead 12b. The asymmetric nature of the tire 10 is characterized in that the nominal diameters of the two beads 12a, 12b are different. More particularly, for the tire 10 as illustrated, the bead toe diameter D2 of the first bead 12a is less than the bead heel diameter D4 of the second bead 12b. The radially inner limits of the beads 12a and 12b are labeled L1 and L2, respectively. These limits correspond to the point where the tire diameter is least. Thus, for the bead 12a, the diameter at the limit L1 is D1. For the bead 12b, the diameter at the limit L2 is D4. This tire construction allows mounting on special wheel rims, and also provides advantages in tire molding, as will be described hereinbelow.

The present invention will be described in a preferred embodiment that advantageously molds green (unvulcanized) tires that have undercut beads and asymmetric bead diameters such as for the prior art tire 10 of FIG. 1. It should be understood that the present invention is not limited to the molding of such tires. Rather, the present invention can provide improvements and benefits compared to the prior art when used in any tire mold, particularly molds wherein the use of a radially expandable bead molding ring is desired. For example, two radially expandable bead molding rings according to the present invention could be used in a mold for tires with normal, symmetric bead diameters and any bead base profile, but especially for undercut bead bases that cannot be molded without positioning at least a portion of the bead molding rings axially inward of the beads. Or, for example, two radially expandable bead molding rings according to the present invention could be used to grip inside portions of the beads in order to allow tire molding in "membrane-less vulcanizing presses" such as those described in U.S. Pat. No. 4,236,883.

The detailed description will include certain directional terms, including "radial", "axial", "meridional", "inward", and "outward". These terms are well known for tires, and when used herein with respect to tire molds and mold presses the terms should be understood in an analogous way wherein a center post of the mold press is located at the axis of rotation of the mold as well as that of a tire placed in the mold. Thus "axial" directions are directions parallel to the center post and parallel to the axis of rotation of a tire placed in the mold. Likewise, a radial direction is in the direction of a radius line originating at the axis of rotation of the mold that is also the axis of a tire placed in the mold. Similarly, "inward", "outward" and related terms are relative to the interior cavity of the mold and/or the tire.

FIGS. 2–5 illustrate key steps of the preferred embodiment of the inventive molding process carried out on a tire 110, as shown in meridional cross-section for one half of the tire 110 and mold 200 in a mold press 220. Referring first to FIG. 5, showing the tire 110 being molded, it can be seen that the tire 110 is similar to the tire 10, having undercut beads 112a, 112b (collectively referred to as 112) and asymmetric bead diameters such that the diameter D4 at the heel 120b of the bottom bead 112b is greater than or equal to the diameter D2 at the toe 122a of the top bead 112a. This particular bead diameter asymmetry enables the use of a solid (continuous ring, not segmented) top bead molding ring 230 such as the continuous counter molding ring (13) of the prior art '193 patent. An inventive radially expandable bead molding ring assembly 250 is utilized for molding the bottom bead 112b.

For the sake of simplicity and clarity in FIGS. 2–5, cross-section shading of parts is omitted, as are the internal elements of the tire 110. The tire 110 has beads 112, a tread 116, and sidewalls 114a, 114b (collectively referred to as 114) extending between the tread 116 and each bead 112.

The axially outer surface of the sidewalls of a tire, including the beads, is generally molded by a part called a sidewall plate, illustrated as a top sidewall plate 202a and a bottom sidewall plate 202b, referred to collectively as sidewall plates 202. A sidewall plate 202 starts from the position of least diameter, conventionally the radially innermost tip of the bead 112, and extends about to the shoulders of the tire. In fact, sometimes elements independent of the sidewall plates 202 are used to mold the axially outer face of a bead 112, but in the context of the present invention, it is immaterial whether the part molding the outer surface of the bead 112 is integrated with the sidewall plate 202 or separate from it.

The loading, molding, and release of a tire 110 involve relative motions in an axial direction between the tire 110 and each of the sidewall plates 202 molding it. In FIGS. 2–5, it is readily seen that the shape to be imparted to the outer surface of the beads 112 and sidewalls 114 is compatible with relative motion in an axial direction between each of the sidewall plates 202 and the tire 110. The undercut bead design creates axially-inward facing portions of the beads 112 that must be molded to a shape that cannot be imposed with the desired accuracy by means of a vulcanizing membrane 210. Hence, the use of additional rigid molding parts, the bead molding rings, is required. In the preferred embodiment shown in the drawings, the top bead molding ring 230 is a continuous ring, and the bottom bead molding ring 252 is a segmented ring. The fact that the ring for molding the bead of greater diameter is a segmented ring makes it possible to mold undercut beads, such as the illustrated beads 112. The bead molding rings 230, 252 are thus intended to mold the portion of each of the beads 112 from the point where the sidewall plates 202 end their molding effect, inward to the point where the vulcanizing membrane 210 can begin effective molding.

In the mold 200 proposed for the preferred embodiment of the present invention, the value of the diameter D2 for the bead 112a of lesser diameter is less than or equal to the diameter D4 for the bead 112b of greater diameter. Hence, it is possible to pass the continuous bead molding ring 230 inside the opposite bead 112b. This continuous bead molding ring 230 is made in one piece. On the other side, the segmented bead molding ring 252 is made in several segments: a group of first segments 254 and a group of second segments 256. This enables the segmented bead molding ring 252 to be retracted so that the tire 110 can be placed in the mold 200 and be extracted after vulcanizing.

More specifically, FIGS. 6A and 6B show that the bead molding ring 252 comprises a number N of first segments 254 (here N=3), and a like number N of second segments 256 complementary to, and circumferentially alternated with, the first segments 254. The first segments 254 (also known as wedge segments) are wedge shaped, having circumferentially lateral faces 255 that converge towards a radially outward-facing bead molding surface (259 as seen in the cross-sectional view of FIG. 9) of the bead molding ring 252, the first segment lateral faces 255 being planar and oriented in the axial direction. The second segments 256 have lateral faces 257 that are complementary to the lateral faces 255 of the first segments 254. To avoid clutter in the drawings, the lateral faces 255 and 257 are only labeled with numbers around the first segment 254 at the top of FIGS. 6A and 6B, but it should be understood that similar labeling applies to all of the segments 254 and 256. FIG. 6A shows the segmented bead molding ring 252 in a radially expanded state, and FIG. 6B shows the segmented bead molding ring 252 in a radially retracted state. It can be seen that pushing radially outward (direction 310) on the first segments 254 causes the first segments 254 to wedge between the second segments 256 and to push them radially outward also. The segmented bead molding ring 252 is radially expandable from a retracted outside diameter $D_r$ (outlined in FIG. 6B with a dotted circle) to an expanded outside diameter $D_e$. The retracted outside diameter $D_r$ is less than or equal to the inside diameter D4' (see FIG. 2) of an unmolded bead 112b' that is to be molded by the segmented bead molding ring 252. When expanded to the expanded outside diameter $D_e$, the segmented bead molding ring has a circumferentially continuous radially outward-facing surface 259 for molding the bead 112b', typically to form the bead base 124b.

Finally, for molding the rest of the inner cavity of the tire 110, a vulcanizing membrane 210 is used, membrane vulcanizing being a long used and proven technique. Also, the mold 200 utilizes multiple sectors 201 (e.g., sixteen sectors), movable relative to the sidewall plates 202, to mold the outer surface of a tread 116.

The mold 200 is used in conjunction with a press 220 comprising a base 206 on which is fixed the bottom sidewall plate 202b, and a center post 204. The press 220 also comprises a movable frame (not shown), also called the top frame, to which is fixed the top sidewall plate 202a. Here, certain parts of the press 220, mold 200, and tire 110 are referred to by the adjectives "bottom" and "top" to correspond to the usual terminology, because the presses are generally built to receive a mold positioned with its axis vertical. Of course, the "bottom" or "top" description of parts of the press 220, mold 200, and tire 110 is not limiting, and these is terms are employed only to use conventional terminology.

The mold 200 uses a symmetrical vulcanizing membrane 210, but the symmetry of the membrane is not restrictive. The top end of the vulcanizing membrane 210 is clamped between the top bead molding ring 230 and a top clamp ring 208a that is movably attached to the center post 204. At its bottom end, the vulcanizing membrane 210 is clamped between a bottom lock ring 266, and a bottom clamp ring 208b that is movably attached to the center post 204 by a hub 209 that slides up and down (axially). The bottom lock ring 266 has a special shape (frustraconical) and function according to the invention, as will be described hereinbelow.

The press 220 generally includes other standard elements, not illustrated but well known, that supply vulcanizing heat and pressure, as well as providing required motions to the parts of the mold 200 and press 220. In particular, the hub 209 is generally caused to slide up and down on the center post 204 at various times during the molding process. The present invention utilizes this standard movement capability to drive the expansion and retraction of the inventive segmented bead molding ring 252.

The inventive molding process will now be described with reference to FIGS. 2–5, which illustrate key steps of the process.

First, as illustrated in FIG. 2, an unmolded, unvulcanized tire 110' is loaded down into the mold 200, which is in an opened, loading state. The vulcanizing membrane 210 is deflated and folded inward out of the way, and the tread sectors 201 (not shown) and upper sidewall plate 202a (not shown) are also moved to a non-obstructing position, according to standard practice. The unmolded lower bead 112b' has an inner diameter D4' that is large enough to pass over the continuous top bead molding ring 230 that has a maximum outside diameter D2, which is less than or equal to the diameter D4'. This allows the non-segmented, non-expandable top bead molding ring 230 to be axially inside the unmolded top bead 112a'. The unmolded bottom bead 112b' comes to rest in a bead molding portion of the bottom sidewall plate 202b, after passing over the bottom, segmented bead molding ring 252 so that the segmented bead molding ring 252 is axially inside the unmolded bottom bead 112b'. The segmented bead molding ring 252 is retracted (as shown in FIG. 6B), as allowed by a vertical upward movement of the bottom lock ring 266 that is pulled upward by the bottom clamp ring 208b and hub 209 to which the bottom lock ring 266 is attached. The retraction of the segmented bead molding ring 252 is driven by springs as detailed hereinbelow.

Next, as illustrated in FIG. 3, the segmented bead molding ring 252 is radially expanded (as shown in FIG. 6a), wedged radially outward in reaction to a vertical downward movement of the bottom lock ring 266 that is pushed downward by the bottom clamp ring 208b and hub 209 to which the bottom lock ring 266 is attached. In the expanded state, the segmented bead molding ring 252 places its circumferentially continuous bead molding surface 259 in a position to work with the adjacent bottom sidewall plate 202b to form a bottom bead molding pocket 240b that will mold all surfaces of the bottom bead 112b' except the interior surfaces that are moldable by the vulcanizing membrane 210.

The segments 254, 256 of the segmented bead molding ring 252 are restricted to move only in a radial direction by guide rods 260 as detailed hereinbelow.

The radial-only expansion of the segmented bead molding ring 252 is a feature of the present invention. As illustrated in FIG. 2, the unmolded bead 112b' has a poorly defined shape that may extend to an inner diameter D4' that is somewhat less than the final, molded inner diameter D4. As a result, a portion of the unmolded bead 112b' may extend radially inward over a surface 203 of the bottom sidewall plate 202b. With expandable bead molding rings that pivot down into place, a portion of the bead 112b' could become pinched between the ring and the bottom sidewall plate surface 203. As seen in the transition from FIG. 2 to FIG. 3, the radially expandable bead molding ring 252 of the present invention slides radially outward across the surface 203, thereby pushing the unmolded bead 112b' into the bottom bead molding pocket 240b without pinching any of it.

Next, as illustrated in FIG. 4, the vulcanizing membrane 210 is inflated within the unmolded tire 110'. The bottom bead 112b is held in the bottom bead molding pocket 240b by the segmented bead molding ring 252. Finally, as illustrated in FIG. 5, the molding of the tire 110 is completed in a conventional manner, closing the mold 200 around the tire 110 by moving the tread-molding sectors 201 and the top sidewall plate 202a into place. Pressure and heat are applied in conventional manner, utilizing the mold press 220 and the vulcanizing membrane 210. When the top sidewall plate 202a is in place, it works with the adjacent continuous bead molding ring 230 to form a top bead molding pocket 240a that will mold all surfaces of the top bead 112a except the interior surfaces that are moldable by the vulcanizing membrane 210.

With reference to FIGS. 6A, 6B, 7A, 7B, 8, and 9, details of the inventive radially expandable bead molding ring assembly 250 will be presented. In general, the key elements of the bead molding ring assembly 250 are the segmented bead molding ring 252 comprising first segments 254 and second segments 256 (see FIGS. 6A, 6B); guide rods 260 (FIGS. 7A, 8); springs 268 (FIG. 7B); and the bottom lock ring 266 (FIGS. 7A, 7B, 8). The elements of the bead molding ring assembly 250 are readily removable, so that some or all of the elements may be easily changed according to the desired dimensions and profile to be molded on the corresponding bead of the tire. The segmented bead molding ring 252 is assembled with the bottom sidewall plate 202b by means of the guide rods 260, so that mold changeover is greatly simplified: the bottom sidewall plate 202b and the segmented bead molding ring 252 are simultaneously changed out since they are attached together. The bottom lock ring 266 is usable with a variety of segmented bead molding rings 252 that have different bead molding surfaces 259 and different expanded outside diameters $D_e$ but, if desired, the bottom lock ring 266 can also be easily removed by un-bolting it from the bottom clamp ring 208b.

FIG. 6A, also discussed hereinabove, shows a top view of the segmented bead molding ring 252 in its expanded state. A cross-section taken along the 9—9 line is shown in FIG. 9, which illustrates a cross-sectional profile common to both the first segments 254 and the second segments 256. In the preferred embodiment, the first segments 254 and the second segments 256 differ only in their circumferential extent and in the orientation of their circumferentially lateral faces 255 and 257, respectively, as discussed hereinabove. The solid lines in FIGS. 6A and 6B represent profile edges or corners that are visible in top view, and the dashed lines represent edges or corners that are hidden. In the cross-sectional view of FIG. 9, it can be seen that the radially inner surface of the segmented bead molding ring 252 is a cam surface 258 that slopes radially inward and axially outward (downward as illustrated), at an angle θ to form an annular surface complementary to a frustraconical section. The radially outermost surface of the segmented bead molding ring 252 is the bead molding surface 259, typically shaped to mold the bead base 124b. The bead molding surface 259 may be any desired shape, possibly including a tip 270 to provide multiple angles to the bead base 124b, for example the bead base angles α and β illustrated in FIG. 1 for the prior art tire 10.

Also visible in FIGS. 6A and 6B are holes 272 for mounting the guide rods 260 (one in each of the segments 254 and 256); and spring pockets 274 for seating the springs 268 (two in each of the segments 254 and 256). Reference numbers 272 and 274 are shown for one each of the segments 254 and 256 in FIG. 6A, but should be understood to apply similarly to all of the segments 254 and 256 in FIGS. 6A and 6B. The utility of the holes 272 and spring pockets 274 will become evident in the discussion hereinbelow of FIGS. 7A, 7B, and 8.

FIGS. 7A, 7B and 8 are detailed "close-up" cross-sectional views of the radially expandable bead molding ring assembly 250 of the mold 200. FIGS. 7A and 7B show the assembly 250 with the segmented bead molding ring 252 in the retracted state as in FIGS. 6B and 2, and FIG. 8 shows the assembly 250 with the segmented bead molding ring 252 in the expanded state as in FIGS. 6A and 3, 4 and 5. FIG. 7A is a cross-section taken radially through the center of the hole 272 in a typical segment (e.g., first segment 254) of the segmented bead molding ring 252. FIG. 7B is a cross-section taken radially through the center of the spring pocket 274 in a typical segment (e.g., first segment 254) of the segmented bead molding ring 252. Although the first segment 254 is shown in the illustrations and discussion of FIGS. 7A, 7B and 8, it should be understood that the same elements are present in a similar fashion in the second segments 256.

FIG. 7B shows the spring 268 residing in a radially aligned spring holding hole 275 bored in the bottom sidewall plate 202b. The spring holding hole 275 is aligned with one of the spring pockets 274 of the segment 254, so that the spring 268 can be positioned with one end in the spring holding hole 275 and the other end in the spring pocket 274. The spring 268 is one of two such springs 268 for the segment 254, one on either side of the guide rod 260, and the pair of springs 268 are compression springs designed to apply (as a pair) sufficient force in a radial direction to push the segmented bead molding ring 252 radially inward to a retracted position as shown in FIGS. 2, 6B, 7A and 7B. In FIG. 7B, it can be seen that the frustraconically-shaped bottom lock ring 266 is in a raised position that allows the segmented bead molding ring 252 to retract, i.e., move radially inward toward the center post 204.

FIG. 7A shows the guide rod 260 mounted in a radially aligned mounting hole 272 bored in the segment 254. The guide rod 260 is held in place by a drive pin 264. The mounting hole 272 is aligned with a guide hole 273 bored in the bottom sidewall plate 202b. The radially-aligned guide rod 260 slides within the radially-aligned guide hole 273, thereby confining the segments 254, 256 of the segmented bead molding ring 252 to movement only in radial inward and outward directions. Adjoining below a suitable portion of the guide hole 273, a cavity 276 is cut into the bottom of the bottom sidewall plate 202b. A stop bolt 262 is screwed into the underside of the guide rod 260 in order to provide a limit to the radially inward movement of the segment 254 when the stop bolt 262 stops against a stop surface 277 on the radially inward side of the cavity 276. This limiting effect provides a way to keep the bottom sidewall plate 202b, the segments 254, 256, the guide rods 260 (with pins 264 and stop bolts 262), and the springs 268 all together as a mold assembly 280 that can be easily changed out as a whole during mold changeover. Disassembly requires only the removal of the stop bolts 262. The limiting effect of the stop bolts 262 also keeps the segmented bead molding ring 252 from falling apart (retracting too far under spring action) whenever the bottom lock ring 266 is raised too much, for example, when the bottom lock ring 266 and bottom clamp ring 208b are removed in order to maintain the vulcanizing membrane 210. Furthermore, the stop bolts 262 can be used to define a stopping point for the retracted state of the segmented bead molding ring 252, i.e., to stop the segments 254, 256 in the positions shown in FIG. 6B, with a maximum outside retracted diameter $D_r$ that is less than or equal to the minimum inside diameter D4' of the tire bead to be molded. It should be noted that it is within the scope of the invention to have stop bolts 262 on the guide rods 260 of: all of the segments 254, 256 of the segmented bead molding ring 252; on none of the segments 254, 256; or on some of them (preferably only on the first segments 254, since they, in turn, control radial movement of the second segments 256).

FIG. 8 shows the segmented bead molding ring 252 in the expanded state, i.e., as shown in FIGS. 3–5 and 6A. The downward movement (axially outward, in the direction indicated by arrow 320) that the mold press 220 imparts to the hub 209 and the bottom clamp ring 208b is utilized to also move the bottom lock ring 266 downward (direction 320). The bottom lock ring 266 wedges the first segment 254 radially outward in the direction indicated by arrow 310, the only direction of movement allowed by the radially aligned guide rods 260. As noted hereinabove with reference to FIGS. 6A and 6B, the second segments 256 are in turn wedged radially outward by the first segments 254. It can be seen from FIGS. 6A and 6B that the bottom lock ring 266 will not contact the cam surface 258 of the second segments 256 until the segmented bead molding ring 252 is fully expanded as in FIG. 6A. The bottom lock ring 266 is preferably a ring with a frustraconical radially outer cam surface 267 (best seen in FIG. 7A) that has a cam angle θ that matches the cam angle θ of the complementary cam surface 258 (see FIG. 9) of the segments 254, 256 of the segmented bead molding ring 252. It is within the scope of the present invention to construct alternate embodiments wherein the frustraconical cam surface 267 of the bottom lock ring 266 is replaced by other devices that interact with the cam surfaces 258 of at least the first segments 254 to wedge the first segments outward (direction 310) as the hub 209 is moved downward (direction 320). For example, cam rollers (not shown) could be attached to the hub 209 so that they roll against the cam surfaces 258 of at least the first segments 254.

In FIG. 8 it can be seen that as a result of wedging the segmented bead molding ring 252 radially outward to a fully expanded state, the segment 254 (and 256), in combination with the bottom sidewall plate 202b, and the vulcanizing membrane 210 (not shown) forms a bottom bead molding pocket 240b that will completely surround a tire bead 112b' (not shown) to mold it on all sides to the desired profile. By comparison with FIG. 7A, it can be seen that the bead molding surface 259 of the segment 254 has moved radially over the surface 203 of the bottom sidewall plate 202b, thereby forming an unmolded bead 112b' without pinching it. The guide rod 260 has moved into the guide hole 273, thereby moving the stop bolt 262 into the cavity 276 away from the stop surface 277. Outward movement of the segments 254, 256 of the segmented bead molding ring 252 is stopped when the ring 252 reaches the fully extended state, preferably by causing the segments 254, 256 to stop against the bottom sidewall plate 202b. For example, as best seen in FIG. 7A, an outer stop surface 278 (also shown in FIG. 9) of the segments 254, 256 can stop against an inner surface 242 of the bottom sidewall plate 202b.

Thus has been described an inventive tire mold with an inventive radially expandable bead molding ring and an inventive method for molding tires using the inventive mold. The expandable bead molding ring 252 has been simplified over prior art expandable rings, its expansion being only in the radial direction, driven by a simple wedging action caused by a single ring-shaped cam 266. The elements of the expandable bead molding ring 252 are combined with the sidewall molding plate 202b to form a mold assembly 280 that is easily maintained and easily switched in a mold press 220 to adapt to different profiles to be molded on beads of different tire constructions.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A mold for a green tire comprising a tread, two beads each having a radially inward-facing bead base extending from an axially outer heel to an axially inner toe, and two sidewalls extending between the beads and the tread; the mold comprising:

first and second sidewall plates for molding, respectively, an outer surface of each of the sidewalls plus an axially outer portion of each of the beads approximately in to the heel;

first and second bead molding rings for molding at least the bead bases of the two beads; and an inflatable vulcanizing membrane for molding the inside surfaces of the tire;

wherein at least a first bead molding ring is characterized in that:

the first bead molding ring comprises a plurality of segments, half of the segments being first segments that are complementary to, and circumferentially alternated with second segments;

the first segments are wedge shaped, having circumferentially lateral faces that converge towards a radially outward-facing bead molding surface of the first bead molding ring, the first segment lateral faces being planar and oriented in the axial direction;

the second segments have lateral faces that are complementary to the first segment lateral faces;

means are provided for radially expanding the first bead molding ring from a first outside diameter to a second outside diameter, thereby forming a circumferentially continuous radially outward-facing surface for molding one of the beads in cooperation with an adjacent first sidewall plate and the vulcanizing membrane;

guide rods restrict first and second segments to radial movement only; each guide rod being mounted in a radially aligned mounting hole bored in a one of the first and second segments, and each mounting hole being aligned with a guide hole bored in the adjacent first sidewall plate such that the guide rod slides within the radially-aligned guide hole; and springs are preloaded to force radially-inward movement of the first and second segments; each spring residing in a radially aligned spring holding hole bored in the adjacent first sidewall plate and aligned with a spring pocket cut in an adjacent one of the first and second segments, so that a spring can be positioned with one end in the spring holding hole and the other end in an adjacent spring pocket.

2. A mold according to claim 1, further characterized by:

an assembly comprising the first sidewall plate, all of the plurality of first segments and second segments, all of the guide rods, and all of the springs;

wherein the assembly is held together by stop bolts extending from a side of at least one of the guide rods, each stop bolt protruding into a cavity adjoining a portion of the corresponding guide hole.

3. A mold according to claim 1, further characterized by:

a cam surface on the radially inner portion of the first and second segments of the bead molding ring, wherein the cam surface slopes radially inward and axially outward at a cam angle to form an annular surface complementary to a frustraconical section; and a cam attached to an axially-moving part of the mold press such that the cam interacts with the cam surfaces of at least the first segments to wedge the first segments radially outward as the cam moves in an axial direction.

4. A mold according to claim 3, further characterized in that:

the cam is a ring with a frustraconical radially outer cam surface that has a cam angle that matches the cam angle of the cam surfaces of the bead molding ring.

5. A mold according to claim 4, further characterized in that:

the cam is attached to a clamp ring for clamping one end of the vulcanizing membrane.

6. A mold according to claim 1, further characterized in that:

the second bead molding ring is structurally equivalent to the first bead molding ring, such that the second bead molding ring is characterized in that;

the second bead molding ring comprises a plurality of segments, half of the segments being first segments that are complementary to, and circumferentially alternated with second segments;

the first segments are wedge shaped, having circumferentially lateral faces that converge towards a radially outward-facing bead molding surface of the first bead molding ring, the first segment lateral faces being planar and oriented in the axial direction;

the second segments have lateral faces that are complementary to the first segment lateral faces;

means are provided for radially expanding the second bead molding ring from a first outside diameter to a second outside diameter, thereby forming a circumferentially continuous radially outward-facing surface for molding one of the beads in cooperation with an adjacent second sidewall plate and the vulcanizing membrane;

guide rods restrict first and second segments to radial movement only;

each guide rod being mounted in a radially aligned mounting hole bored in a one of the first and second segments, and each mounting hole being aligned with a guide hole bored in the adjacent second sidewall plate such that the guide rod slides within the radially-aligned guide hole; and springs are preloaded to force radially-inward movement of the first and second segments;

each spring residing in a radially aligned spring holding hole bored in the adjacent second sidewall plate and aligned with a spring pocket cut in an adjacent one of the first and second segments, so that a spring can be positioned with one end in the spring holding hole and the other end in an adjacent spring pocket.

7. A mold according to claim 1, further characterized in that:

the second bead molding ring is a non-segmented, non-expandable, continuous ring that is movably attached to the center post of the mold.

8. A mold according to claim 1, wherein the tire to be molded has asymmetric bead diameters such that a first bead has a first diameter and a second bead has a second bead diameter less than the first bead diameter, the mold further characterized in that:

the second bead molding ring has an outside diameter sized for molding the second bead; and the retractable first bead molding ring has the retracted first outside diameter less than or equal to the first bead diameter, and the expanded second outside diameter is sized for molding the first bead.

9. A mold according to claim 1, further characterized in that:

the first and second bead molding rings are shaped for molding beads with undercut bead bases.

* * * * *